United States Patent
Kelley et al.

(10) Patent No.: US 11,816,734 B2
(45) Date of Patent: Nov. 14, 2023

(54) OPTIMIZATION METHODS AND SYSTEMS USING PROXY CONSTRAINTS

(71) Applicant: U.S. Bank National Association, Minneapolis, MN (US)

(72) Inventors: Sean B. Kelley, Oak Park, IL (US); Andrew L. Hosford, Cicero, IL (US)

(73) Assignee: U.S. BANK NATIONAL ASSOCIATION, Minneapolis, MN (US)

(*) Notice: Subject to any disclaimer, the term of this patent is extended or adjusted under 35 U.S.C. 154(b) by 0 days.

(21) Appl. No.: 17/528,097

(22) Filed: Nov. 16, 2021

(65) Prior Publication Data

US 2022/0156839 A1     May 19, 2022

Related U.S. Application Data

(60) Provisional application No. 63/114,282, filed on Nov. 16, 2020.

(51) Int. Cl.
     *G06Q 40/06*        (2012.01)
     *G06Q 40/03*        (2023.01)

(52) U.S. Cl.
     CPC ............ *G06Q 40/06* (2013.01); *G06Q 40/03* (2023.01)

(58) Field of Classification Search
     CPC .................................................... G06Q 40/06
     See application file for complete search history.

(56) References Cited

U.S. PATENT DOCUMENTS

| | | | |
|---|---|---|---|
| 8,670,960 B2 | 3/2014 | Couet et al. | |
| 2004/0186804 A1 | 9/2004 | Chakraborty et al. | |
| 2013/0226780 A1* | 8/2013 | Haggerty | G06Q 40/02 |
| 2017/0124652 A1* | 5/2017 | Beaven | G06Q 40/06 |
| 2019/0050761 A1 | 2/2019 | Ramakrishnan et al. | |
| 2021/0374862 A1* | 12/2021 | Ramanathan | G06Q 40/06 |

OTHER PUBLICATIONS

Sariannidis, N., et al., in "Default avoidance on credit card portfolios using accounting, demographical and exploraoty factors: decision making based on machine learning (ML) techniques," from Annals of Operations Research (2020), (Year: 2020).*

(Continued)

*Primary Examiner* — Bruce I Ebersman
*Assistant Examiner* — Brandon M Duck
(74) *Attorney, Agent, or Firm* — Greenberg Traurig, LLP (57) ABSTRACT

A method includes receiving, by a server device, a plurality of input settings from a client device. In a tangible memory, the server device stores the plurality of input settings. The server device sets a linear proxy constraint based on the plurality of input settings to replace a non-linear constraint. The server device solves a system of equations to determine a feasible solution. The server device determines the feasible solution. Based on the determining the feasible solution, determining, by the server device, whether a current solution satisfies a convergence criterion. In response to determining the current solution satisfies the convergence criterion, the current solution is stored in the tangible memory by the server device. In response to determining the current solution does not satisfy the convergence criterion, the server device updates one or more of the input settings and solving the system of equations.

16 Claims, 4 Drawing Sheets

(56) References Cited

OTHER PUBLICATIONS

Hurst, et al.; "Dynamic Approximation of Complex Graphical Constraints by Linear Constraints"; UIST '02: Annual ACM Symposium on User Interface Software and Technology; France/New York; Oct. 27-30, 2002; vol. 4, Issue 2; pp. 191-200.

Extended European Search Report, issued by the European Patent Office, regarding corresponding patent application Serial No. EP21208213.5; dated May 24, 2022; 9 pages.

* cited by examiner

OPTIMIZATION METHODS AND SYSTEMS USING PROXY CONSTRAINTS

RELATED APPLICATIONS

The present application claims priority to U.S. Provisional Application No. 63/114,282, entitled "OPTIMIZATION METHODS AND SYSTEMS USING PROXY CONSTRAINTS," and filed on Nov. 16, 2020, the entirety of which is hereby incorporated by reference.

FIELD

At least some embodiments disclosed herein relate generally to computer-implemented methods and systems for quantitative optimizations. More particularly, at least some embodiments disclosed herein relate to computer-implemented methods and systems for quantitative optimizations by replacing a non-linear constraint with a linear proxy constraint.

BACKGROUND

Constrained optimization problems can include a number of different constraints. Some of these constraints may be non-linear. Such non-linear optimizations can be computationally intensive and require a significant amount of time to complete to ensure an actual optimum (minimum or maximum) was reached.

SUMMARY

Some embodiments relate to a computer-implemented method. The method includes receiving, by a server device, a plurality of input settings from a client device. In a tangible memory, the server device stores the plurality of input settings. The server device sets a linear proxy constraint in place of a non-linear constraint based on the plurality of input settings. The server device solves a system of equations to determine a feasible solution. The method includes determining the feasible solution by the server device. Based on determining the feasible solution, determining, by the server device, whether a current solution satisfies a convergence criterion. In response to determining the current solution satisfies the convergence criterion, the current solution is stored in the tangible memory by the server device. In response to determining the current solution does not satisfy the convergence criterion, the server device updates one or more of the input settings and solves the system of equations.

In some embodiments, the method repeats until the convergence criterion is satisfied or the method is ended by a user.

In some embodiments, the linear proxy constraint includes a plurality of linear proxy constraints in place of the non-linear constraint.

In some embodiments, the linear proxy constraint includes a plurality of linear proxy constraints and the non-linear constraint includes a plurality of non-linear constraints.

In some embodiments, the system of equations is a system of linear equations. In some embodiments, the system of equations is a system of linear and non-linear equations.

In some embodiments, the method advantageously produces a portfolio distribution in less time than applying the non-linear constraints.

In some embodiments, the method includes displaying, on the client device, a graphical user interface (GUI) to receive the plurality of input settings from a user. In some embodiments, the plurality of input settings from the user enables the user to customize the optimized solution.

In some embodiments, the method includes displaying a current solution on the GUI.

In some embodiments, a system is described. The system includes a server device including a processor and a memory. The server device is configured to receive a plurality of input settings from a client device; and store in the memory the plurality of input settings. The server device sets a linear proxy constraint based on the plurality of input settings in place of a non-linear constraint. The server device solves a system of equations to determine a feasible solution and determines the feasible solution. Based on the determined feasible solution, the server device determines whether a current solution satisfies a convergence criterion. In response to determining the current solution satisfies the convergence criterion, the serve device stores in the tangible memory the current solution. In response to determining the current solution does not satisfy the convergence criterion, the server device updates one or more of the input settings and solves the system of equations.

In some embodiments, the method repeats until the convergence criterion is satisfied or the method is ended by a user.

BRIEF DESCRIPTION OF THE DRAWINGS

Reference is made to the drawings that form a part of this disclosure, and which illustrate the embodiments in which the devices and methods described herein can be practiced.

Like reference numbers represent the same or similar parts throughout.

DETAILED DESCRIPTION

Asset managers can manage a portfolio of items such as stocks and other investment assets. One such type of portfolio includes a leveraged loan portfolio. One type of leveraged loan investment is a cash-flow collateralized loan obligation (CLO). There are various compliance requirements for leveraged loan portfolios that define boundaries within which a portfolio manager can invest.

Generally, determining a globally optimal solution for a non-linear optimization, such as a portfolio optimization, by using only a pen and paper or a general calculating computer takes an amount of time that is unacceptable and useless in modern management of portfolios. Portfolio managers, who manage portfolios, are thus unwilling to and cannot wait this amount of time for determining the globally optimal solution. Modern managed investment decisions require a specialized computer-implemented tool that can be run iteratively so the portfolio manager can evaluate the output, make adjustments, and rerun until a satisfactory solution is found. Embodiments herein utilize a specialized computer-implemented tool that applies a small number of linear proxy constraints that are adjusted in a hierarchical manner.

The user can modify one or more input settings of the specialized computer-implemented tool to control the application of the proxy constraints. The specialized computer-implemented tool outputs a desired solution within a time duration which is useable and acceptable. The outputs provided within the time duration by the embodiments of the specialized computer-implemented tools and methods disclosed herein cannot be performed entirely in a human's mind (even if aided with pen and paper).

A Diversity Score is based on a tool developed by Moody's Investors Service. The Diversity Score is an estimation of portfolio diversification in collateralized debt obligations (CDOs). The Diversity Score is an example of a non-linear constraint. There are other compliance criterion which are non-linear, the Diversity Score being an example. A set of proxy constraints can properly estimate the Diversity Score, as verified by calculating the actual Diversity Score of the optimized portfolio and then comparing that value to the actual Diversity Score threshold. If the proxy constraint value does not lead to an optimized portfolio with a passing Diversity Score value, the input settings can be adjusted, and the portfolio optimizer rerun. Thus the portfolio optimizer can run a linear model through several cycles (e.g., at ten to twenty seconds per cycle) with a lower cumulative calculation time than running a non-linear optimization, which can take several minutes. Thus, the portfolio optimizer can find an acceptable answer relatively quickly and give the user the ability to control how the non-linear optimization searches the solution surface.

Embodiments of this disclosure include replacing non-linear constraints with proxy constraints that approximate the original constraints. A relationship between the proxy constraints and the original constraints follows from a machine learning process that advises a user of misalignment between the proxy constraint settings and the original constraints. The user can select what proxy constraints the portfolio optimization system should modify in the situation of misalignment.

Embodiments of this disclosure include replacing non-convex constraints with proxy constraints that approximate the original constraints. A relationship between the proxy constraints and the original constraints follows from a machine learning process that advises a user of misalignment between the proxy constraint settings and the original constraints. The user can select what proxy constraints the portfolio optimization system should modify in the situation of misalignment.

The term "linear" is used herein to include "convex" and "non-convex." Accordingly, the term "linear optimization" includes one or more of "convex optimization," "non-convex optimization," and "concave optimization." Further, the methods described herein can be applied to convex optimization problems, where non-convex problems are proxied by substituting convex functions for non-convex functions. The embodiments herein include an example of a subset of the convex superset for which performant algorithms exist to solve.

Figure 1:
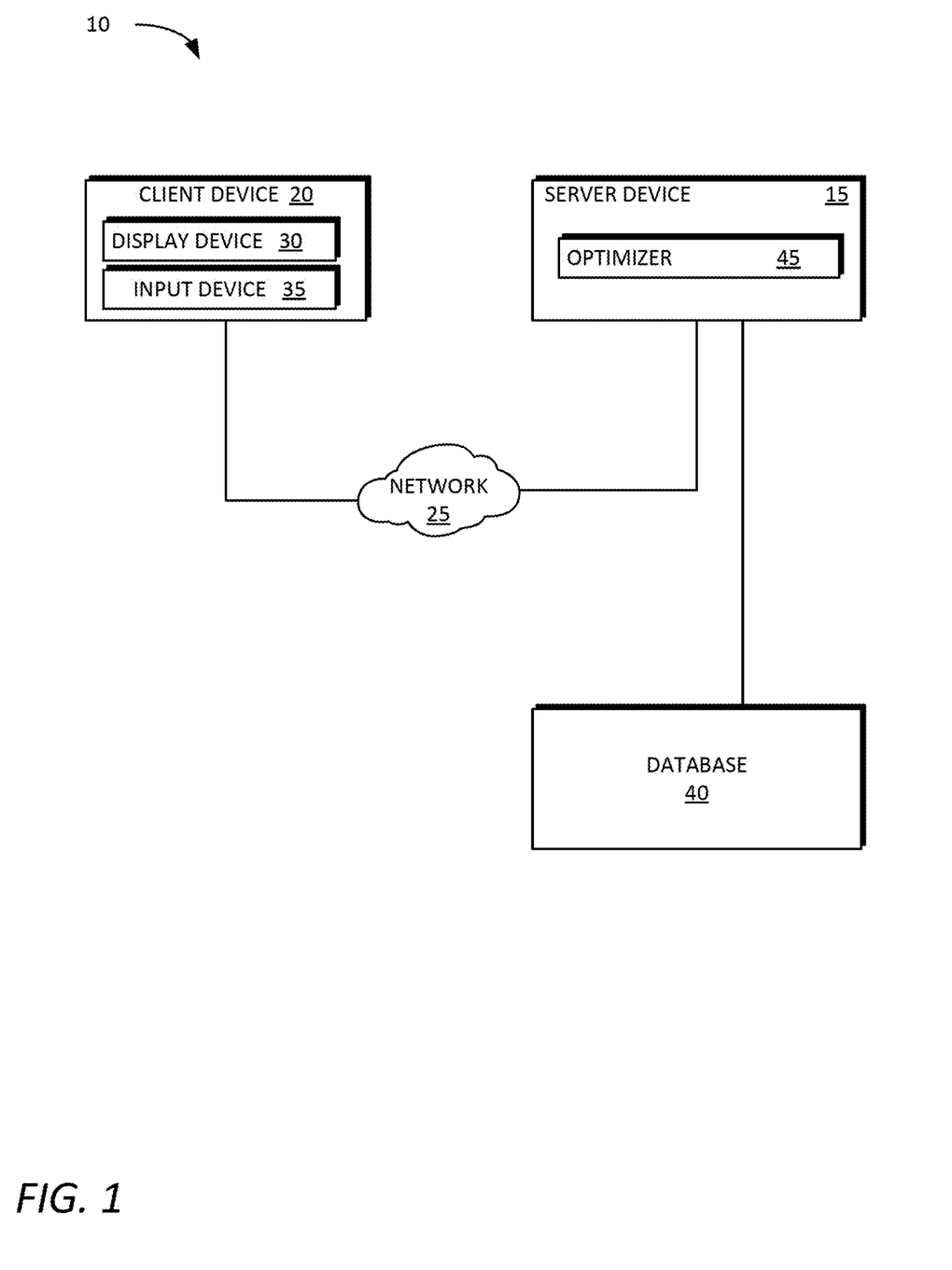
FIG. 1 is a diagrammatic view of an example portfolio optimization system, according to some embodiments.

FIG. 1 is a diagrammatic view of an example portfolio optimization system 10, according to some embodiments. The system 10 can implement the systems, methods, and graphical user interfaces (GUIs) for optimizing a portfolio, according to some embodiments. The system 10 can, for example, enable a user (e.g., a portfolio manager or the like) to modify a current portfolio distribution to a new portfolio distribution.

The system 10 includes a server device 15 in communication with a client device 20 via a network 25. In some embodiments, the system 10 can include a plurality of client devices 20 connected in communication with the server device 15 via the network 25. It is to be appreciated that the number of users, and accordingly, the number of client devices 20 can vary. Generally, there will be a plurality of client devices 20. In the illustrated embodiment, a single server device 15 is illustrated. It is to be appreciated that the number of server devices 15 can vary. The server device 15 can make the portfolio optimization system available to the client device 20 via the network 25. In some embodiments, the server device 15 can make one or more GUIs available to the client device 20.

The server device 15 includes a processor and a tangible memory. An optimizer 45, which is or includes some embodiments of a specialized computer-implemented tool, is stored on the tangible memory and executable by the processor. The optimizer 45 can be used to maximize or minimize an objective function, such as to maximize a weighted average spread (WAS) for a portfolio or minimize a weighted average rating factor (WARF). It is to be appreciated that these are just examples and that other objective functions can be applied within the scope of the principles discussed herein. When maximizing the WAS for the portfolio, there can be several constraints such as, but not limited to, a weighted average rating factor (WARF), a weighted average recovery rating (WARR), a maximum second lien concentration, combinations thereof, or the like. It is to be appreciated that these are just examples and that other constraints can be applied within the scope of the discussion herein. Each loan may have more than 25 variables that the optimizer treats as constraints when those variables are aggregated among all other portfolio assets. The optimizer 45 can consider a Diversity Score, an issuer concentration distribution, a set of proxy constraints used to approximate the non-linear Diversity Score constraints, a trade size constraint, or combinations thereof.

The optimizer 45 is configured to solve a system of equations based on a plurality of input settings received from the client device 20. In some embodiments, the system of equations includes a system of linear equations. In some embodiments, the system of equations includes a system of linear and non-linear equations. In some embodiments, the optimizer 45 is configured to define a linear proxy constraint to approximate a non-linear constraint in a constrained optimization. In some embodiments, the optimizer 45 is configured to define a plurality of linear proxy constraints to approximate a non-linear constraint. In some embodiments, the optimizer 45 is configured to define a plurality of linear proxy constraints to approximate a plurality of non-linear constraints. That is, a relationship between a number of linear proxy constraints to a number of non-linear constraints can be 1:1, many:1, or many:many, according to some embodiments. In some embodiments, there may be a predefined constraint convergence priority to ensure that when there is a plurality of linear proxy constraints, one of the plurality of linear proxy constraints does not cause a problem with another of the linear proxy constraints. The prioritization can be predetermined as part of the linear proxy constraints identified relative to the non-linear constraints for the optimizer 45.

Aspects of the server device 15 can be the same as or similar to aspects of the computer device 300 shown and described in accordance with FIG. 3 below.

Examples of the client device 20 include, but are not limited to, a personal computer (PC); a laptop computer; a mobile device such as, but not limited to, a smartphone, a wearable device (e.g., a smartwatch, a head-wearable device, or the like), a tablet-style device, or the like. The client device 20 generally includes a display device 30 and an input device 35. It is to be appreciated that the display device 30 and the input device 35 can be integrated (e.g., a touchscreen). A GUI for the portfolio optimizer can be displayed on the display device 30.

The network 25 may be representative of the Internet. In some embodiments, the network 25 can include, for example, a local area network (LAN), a wide area network (WAN), a wireless network, a cellular data network, a mesh network, a radio frequency network, wireless optical network (e.g., LiFi), combinations thereof, or the like.

The server device 15 is shown to be in communication with a database 40. The database 40 is configured to store one or more components usable by the server device 15 when optimizing a portfolio. For example, in some embodiments, the database 40 includes a plurality of assets and attributes defining the assets. In some embodiments, the server device 15 is in communication with the database 40 in a separate communication pathway from the network 25. Although not shown, it will be understood that in other embodiments, the database 40 is configured to be in communication with the server device 15 via the network 25. In some embodiments, the client device 20 can also be in communication with the database 40.

It is to be appreciated that the structure of the system 10 is an example and is not intended to be limiting. In some embodiments, functionality of the various components of the system 10 can be spread across multiple components.

Figure 2:
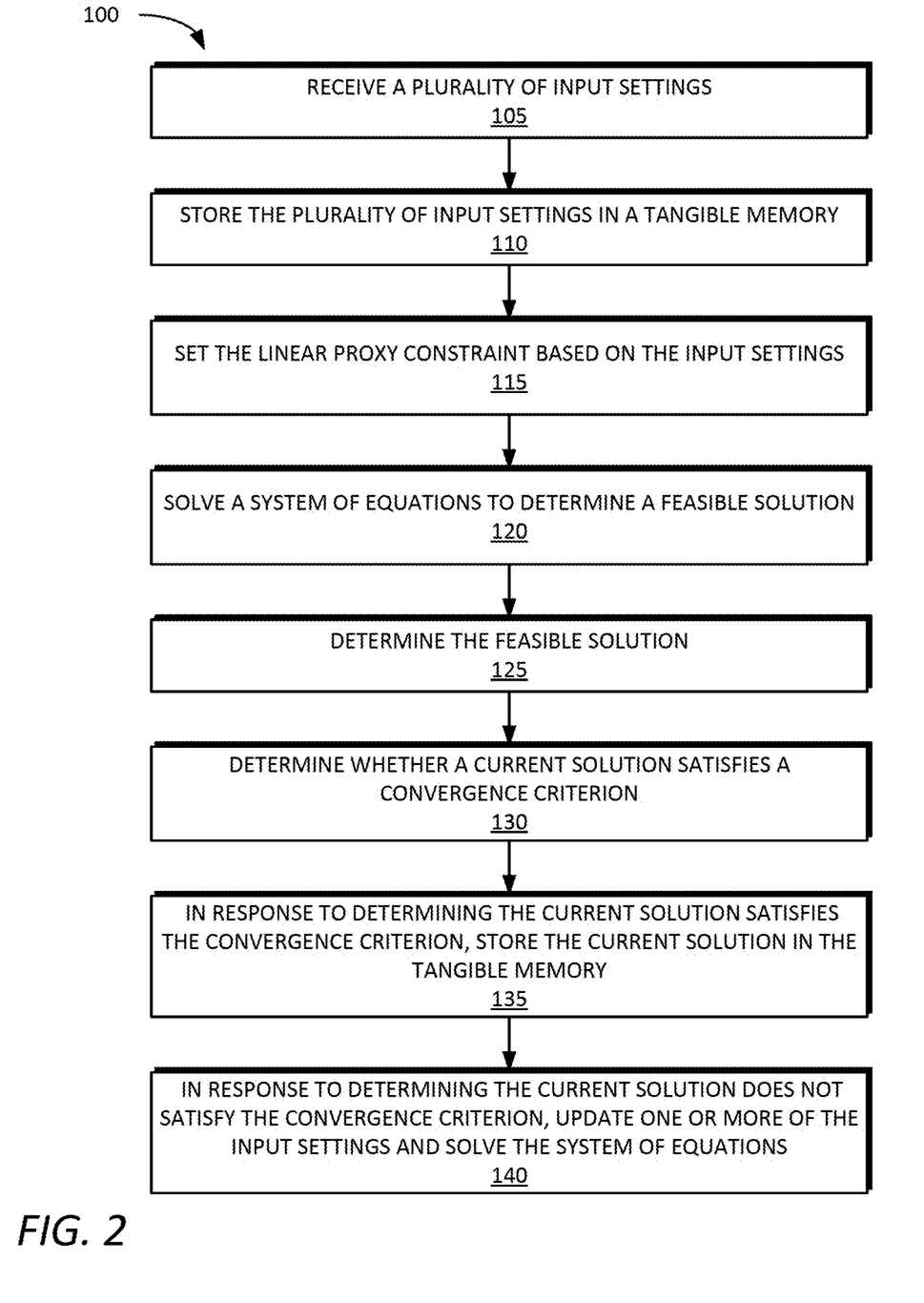
FIG. 2 is a flowchart of a method, according to some embodiments.

FIG. 2 is a flowchart of a method 100, according to some embodiments. The method 100 can generally be used to perform a portfolio optimization on a leveraged loan portfolio (e.g., a CLO portfolio in some embodiments) by using a linear proxy constraint in place of a non-linear constraint. The method 100 can enable a non-linear optimization problem to be estimated via a linear optimization due to the utilization of the linear proxy constraint. In some embodiments, the method 100 uses a plurality of linear proxy constraints in place of a non-linear constraint. In some embodiments, the method 100 can use a plurality of linear proxy constraints in place of a plurality of non-linear constraints. In some embodiments, all non-linear constraints are replaced by at least one linear proxy constraint.

The method 100 includes receiving, by a server device (e.g., the server device 15 in FIG. 1), a plurality of input settings from a client device (e.g., the client device 20 in FIG. 1) at 105. The plurality of input settings corresponds to one or more linear proxy constraints selected to replace non-linear constraints in optimizing an objective function. Thus, the input settings, which can be considered variables of the one or more linear proxy constraints, can enable control over the optimization by the user.

In some embodiments, the plurality of input settings includes one or more of: a minimum trade size, a minimum post trade size, a max issuer concentration, an average issuer size, a beta value corresponding to a beta shape, and a number of buckets. In some embodiments, one or more of the input settings can be modified by a user via the client device 20 (FIG. 1) and received by the server device 15 via the network 25. The beta value corresponding to the beta shape can be set according to the following equation, where $\mu$ equals the average issuer size:

$$\mu = \frac{\alpha}{\alpha + \beta}$$

If this value is set as the mean and held constant, the distribution shape can be controlled by altering one of the variables $\alpha$ or $\beta$. In some embodiments, $\beta$ can be utilized. In some embodiments, a larger $\beta$ value results in tighter issuer distribution clustered around the mean.

In a tangible memory, the server device 15 stores the plurality of input settings at 110. The server device 15 sets the one or more linear proxy constraints based on the plurality of input settings at 115.

The server device 15 solves a system of equations to determine a feasible solution at 120. The term "feasible solution" includes a "globally optimal feasible solution." While non-linear optimizers might be able to quickly find a local optimal feasible solution, such local optimal feasible solution may not be globally optimal. Determining whether a better solution exists elsewhere in the feasible set is what causes non-linear optimizations to take a long time (i.e., unacceptably long-time duration) to find a globally optimal feasible solution. The methods and devices disclosed herein finds globally optimal feasible solutions within an acceptable amount of time. In some embodiments, the system of equations includes linear equations without non-linear equations. In some embodiments, the system of equations can include a non-linear equation. In some embodiments, the system of equations can be stored in a database (e.g., the database 40 in FIG. 1). As such, the equations for the optimization problem may be predefined, but the application of the one or more linear proxy constraints replacing the non-linear constraints can be modified by the user.

The method includes determining the feasible solution by the server device 15 at 125.

Based on the determining the feasible solution, determining, by the server device, whether a current solution satisfies a convergence criterion at 130. In some embodiments, the convergence criterion can be based on the plurality of input settings.

In response to determining the current solution satisfies the convergence criterion, the current solution is stored in the tangible memory by the server device at 135. Additionally, when the current solution satisfies the convergence criterion, the results of the portfolio optimization can be displayed to the user. Additionally, a difference between the current portfolio and an optimized portfolio can be displayed on the user device.

In response to determining that the current solution does not satisfy the convergence criterion, the server device updates one or more of the input settings and solves the system of equations at 140.

In some embodiments, the method 100 repeats until the convergence criterion is satisfied or the method is ended by a user.

Figure 3:
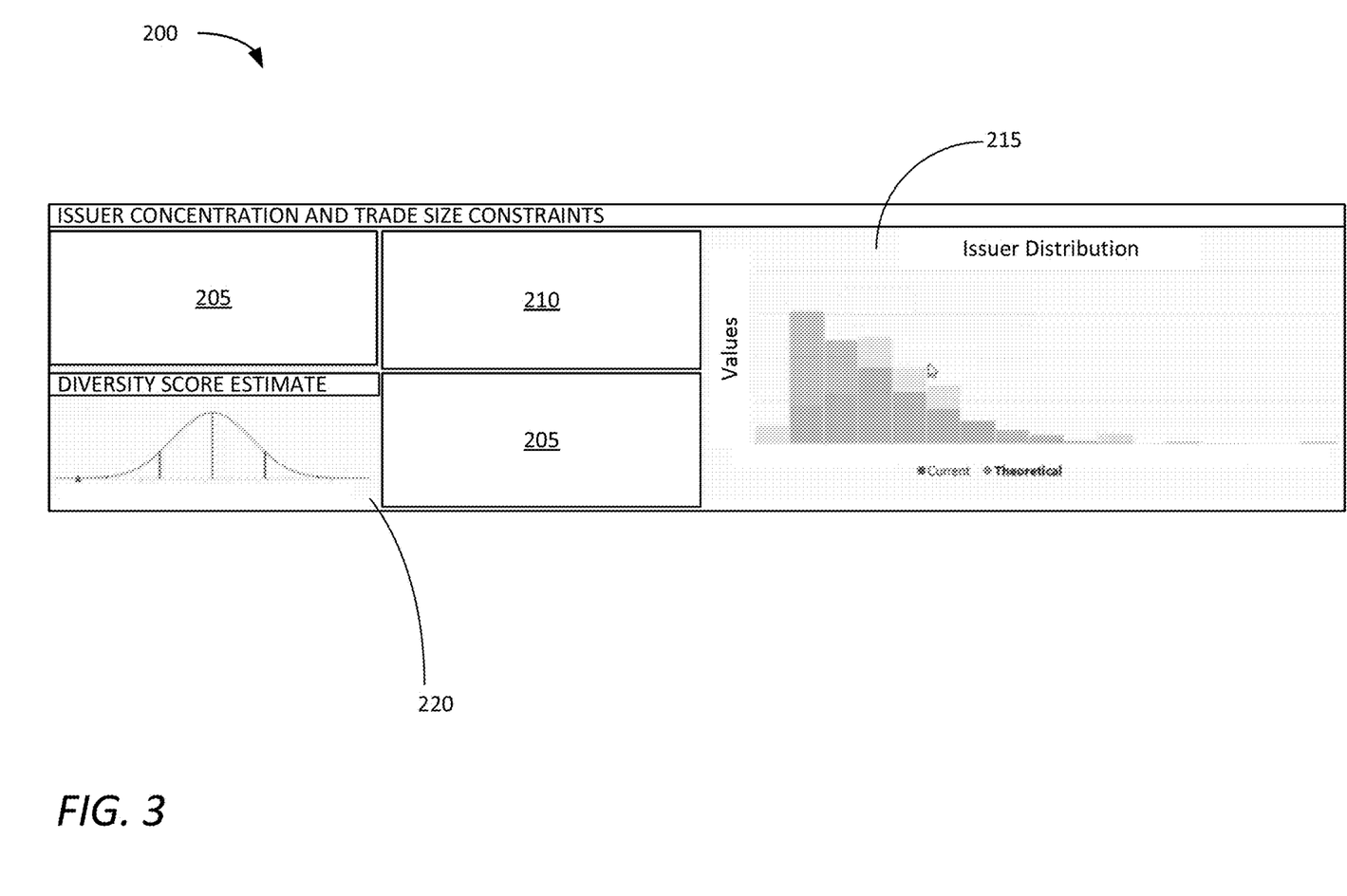
FIG. 3 is a graphical user interface (GUI), according to some embodiments.

FIG. 3 is an exemplary view of a graphical user interface (GUI) 200, according to some embodiments. The GUI 200 is displayed on the display device 30 (FIG. 1) of the client device 20 (FIG. 1). The GUI 200 generally displays both an input and an output of the portfolio optimization system 10 (FIG. 1). In some embodiments, the input and output can alternatively be split onto different GUIs. However, the combination enables the user to make changes to one or more inputs and, without additional clicks such as to click submit or the like, the user is presented with the output of the portfolio optimization. In some embodiments, the output can be in real-time or substantially real-time. In some embodiments, the speed at which the result is displayed to the user is a result of the usage of the proxy constraints instead of a non-linear optimization, which could take significantly longer than the optimization using the linear proxy constraints as described herein.

The GUI 200 includes a plurality of inputs 205, an output 210, optionally an output 215, and a Diversity Score estimate 220.

The plurality of inputs 205 can include a minimum trade size, a minimum post trade size, a max issuer concentration, an average issuer size, a beta value corresponding to a beta shape, and a number of buckets. In some embodiments, the plurality of inputs 205 can include an indication of convergence criterion and a step size by which to increment the input settings if the convergence criterion is not satisfied. In this manner, the user can have control over the starting points of the optimization, the convergence criterion required to identify an optimization, and an amount of incremental changes until the convergence criterion is satisfied. In some embodiments, the plurality of inputs 205 can include one or more trade constraints such as, but not limited to, a maximum number of trades to execute, a maximum number of buys to execute, a maximum number of sells to execute, or any combination thereof.

The output 210 can show a current number of assets, broken down by a percentage amount of the asset in the portfolio. The output 210 can include this breakdown by the current portfolio, a theoretical ideal portfolio, and for an optimized portfolio once the optimizer has been executed. In some embodiments, the optional output 215 can show a graphical depiction of the information in the output 210.

the GUI 200 can additionally include a display of the breakdown of different concentrations of the portfolio relative to one or more categories of the investments. In some embodiments, the breakdown of the different industries can be, for example, based on a service such as Moody's or the like.

The Diversity Score estimate 220 can show a view of the shape of the beta distribution based on the plurality of inputs 205. The Diversity Score estimate 220 can utilize a machine learning algorithm that tracks execution results. In some embodiments, the training data for the machine learning can be from a single client device 20 (i.e., local results) or can be from all client devices 20 that are interacting with the server device 15. In such embodiments, the prediction of the Diversity Score estimate can be more accurate when the training data comes from all client devices 20 interacting with the server device 15.

In some embodiments, the method includes a process of complex if/then requirements of the CLO indenture into mathematical functions via mixed integer programming technique. When combined with convex or linear functions, the combination results in, for example, mixed integer convex programming (MICP) and mixed integer linear programming (MILP). In these embodiments, a set of "decision" variables are added to the function that can take a value (e.g. of either 1 or 0) and the method includes flipping between these two values while performing a search for an optimized solution. Performant algorithms can additionally be used for determining a search process on the solution surface of a MICP or MILP problem, for example, branch-and-bound. In some embodiments, proxy functions include one or more of the MICP or MILP and still yield huge performance gains over a fully non-convex, non-linear problem. In some embodiments, MILP functions are used as an alternative to convex functions. In some embodiments, MICP functions are used as an alternative to linear functions. In some embodiments, one or more of the MILP and MICP functions are used as an alternative to linear or convex functions. In some embodiments, MILP and MICP functions are used in addition to linear or convex functions. In some embodiments, MILP functions are used in addition to convex functions. In some embodiments, MICP functions are used in addition to linear functions.

Figure 4:
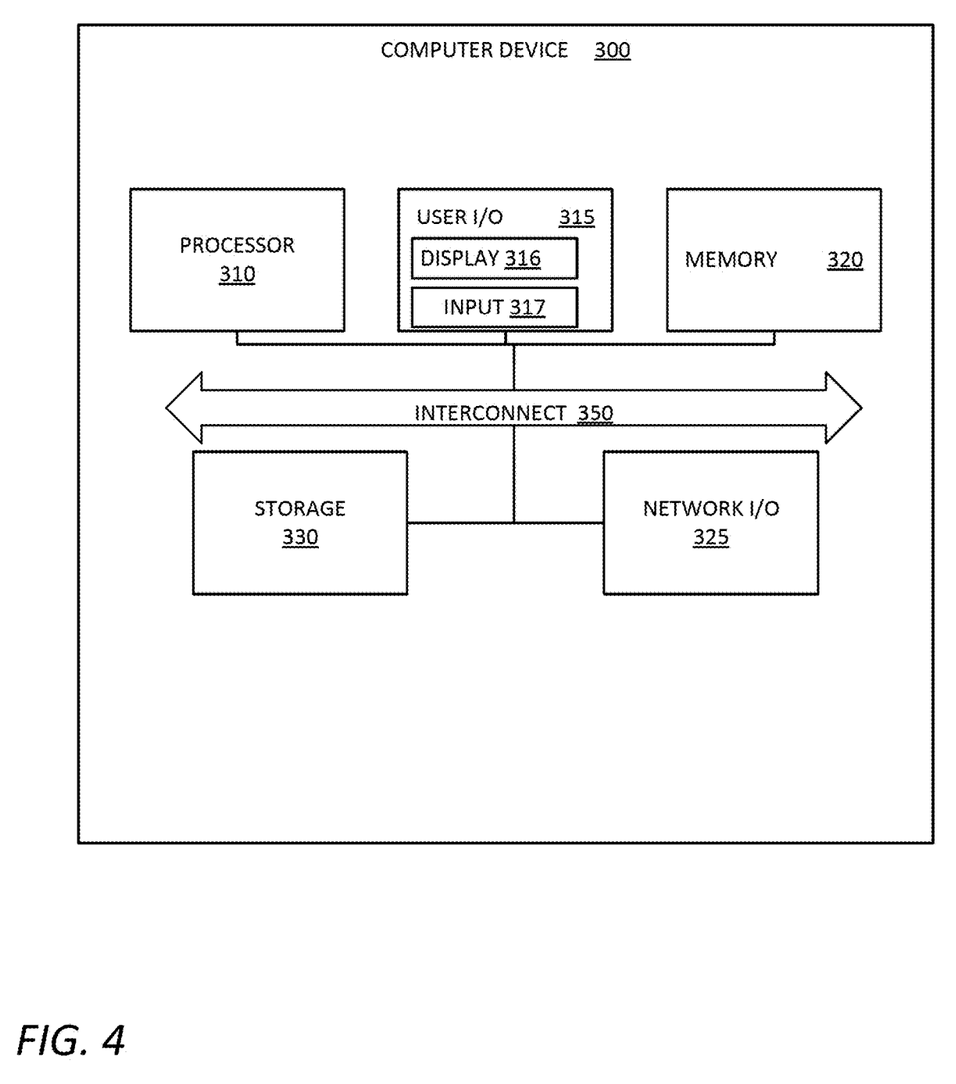
FIG. 4 is a diagrammatic view of an example user computing environment, according to some embodiments.

FIG. 4 is a diagrammatic view of an example user computing environment, according to some embodiments. The computer device 300 and any of the individual components thereof can be used for any of the operations described in accordance with any of the computer-implemented methods described herein.

The computer device 300 generally includes a processor 310, memory 320, a network input/output (I/O) 325, storage 330, and an interconnect 350. The computer device 300 can optionally include a user I/O 315, according to some embodiments. The computer device 300 can be in communication with one or more additional computer devices 300 through a network.

The computer device 300 is generally representative of hardware aspects of the client device 20 (FIG. 1) and the server device 15 (FIG. 1).

The processor 310 can retrieve and execute programming instructions stored in the memory 320, the storage 330, or combinations thereof. The processor 310 can also store and retrieve application data residing in the memory 320. The interconnect 350 is used to transmit programming instructions, application data, or combinations thereof between the processor 310, the user I/O 315, the memory 320, the storage 330, and the network I/O 325. The interconnect 350 can be one or more busses or the like. The processor 310 can be a single processor, multiple processors, or a single processor having multiple processing cores. In some embodiments, the processor 310 can be a single-threaded processor. In some embodiments, the processor 310 can be a multi-threaded processor.

The user I/O 315 can include a display 316 and/or an input 317, according to some embodiments. It is to be appreciated that the user I/O 315 can be one or more devices connected in communication with the computer device 300 that are physically separate from the computer device 300. In some embodiments, the display 316 and input 317 can be physically included with the computer device 300. In some embodiments, the user I/O 315 can physically be part of the computer device 300. For example, a cellular/mobile phone, tablet device, or laptop include the display 316 and input 317 that are part of the computer device 300. The server device 15 generally may not include the user I/O 315. In some embodiments, the server device 335 can be connected to the display 316 and input 317.

The display 316 can include any of a variety of display devices suitable for displaying information to the user. Examples of devices suitable for the display 316 include, but are not limited to, a cathode ray tube (CRT) monitor, a liquid crystal display (LCD) monitor, a light emitting diode (LED) monitor, or the like.

The input 317 can include any of a variety of input devices or input means suitable for receiving an input from the user. Examples of devices suitable for the input 317 include, but are not limited to, a keyboard, a mouse, a trackball, a button, a voice command, a proximity sensor, an ocular sensing device for determining an input based on eye movements (e.g., scrolling based on an eye movement), or the like. It is to be appreciated that combinations of the foregoing inputs 317 can be included for the user devices 301. In some embodiments the input 317 can be integrated with the display 316 such that both input and output are performed by the display 316.

The memory 320 is generally included to be representative of a random access memory such as, but not limited to, Static Random Access Memory (SRAM), Dynamic Random Access Memory (DRAM), or Flash. In some embodiments, the memory 320 can be a volatile memory. In some embodiments, the memory 320 can be a non-volatile memory. In some embodiments, at least a portion of the memory can be virtual memory.

The storage 330 is generally included to be representative of a non-volatile memory such as, but not limited to, a hard disk drive, a solid state device, removable memory cards, optical storage, flash memory devices, network attached storage (NAS), or connections to storage area network (SAN) devices, or other similar devices that may store non-volatile data. In some embodiments, the storage 330 is a computer readable medium. In some embodiments, the storage 330 can include storage that is external to the computer device 300, such as in a cloud.

The network I/O 325 is configured to transmit data via a network. The network may alternatively be referred to as the communications network. Examples of the network include, but are not limited to, a local area network (LAN), a wide area network (WAN), the Internet, or the like. In some embodiments, the network I/O 325 can transmit data via the network through a wireless connection using cellular, 4G, 5G, WiFi, Bluetooth, LifFi, or other similar wireless communication protocols. In some embodiments, the computer device 300 can transmit data via the network through a cellular, 3G, 4G, or other wireless protocol. In some embodiments, the network I/O 325 can transmit data via a wire line, an optical fiber cable, or the like. It is to be appreciated that the network I/O 325 can communicate through the network 340 through suitable combinations of the preceding wired and wireless communication methods.

Aspects described herein can be embodied as a system, method, or a computer readable medium. In some embodiments, the aspects described can be implemented in hardware, software (including firmware or the like), or combinations thereof. Some aspects can be implemented in a non-transitory, tangible computer readable medium, including computer readable instructions for execution by a processor. Any combination of one or more computer readable medium(s) can be used.

The computer readable medium can include a computer readable signal medium and/or a computer readable storage medium. A computer readable storage medium can include any tangible medium capable of storing a computer program for use by a programmable processor to perform functions described herein by operating on input data and generating an output. A computer program is a set of instructions that can be used, directly or indirectly, in a computer system to perform a certain function or determine a certain result. Examples of computer readable storage media include, but are not limited to, a floppy disk; a hard disk; a random access memory (RAM); a read-only memory (ROM); a semiconductor memory device such as, but not limited to, an erasable programmable read-only memory (EPROM), an electrically erasable programmable read-only memory (EEPROM), Flash memory, or the like; a portable compact disk read-only memory (CD-ROM); an optical storage device; a magnetic storage device; other similar device; or suitable combinations of the foregoing. A computer readable signal medium can include a propagated data signal having computer readable instructions. Examples of propagated signals include, but are not limited to, an optical propagated signal, an electro-magnetic propagated signal, or the like. A computer readable signal medium can include any computer readable medium that is not a computer readable storage medium that can propagate a computer program for use by a programmable processor to perform functions described herein by operating on input data and generating an output.

Aspects. It is to be appreciated that any one of aspects 1-11 can be combined with any one of aspects 12-20.

Aspect 1. A computer-implemented method, comprising: receiving, by a server device, a plurality of input settings from a client device; storing in a tangible memory, by the server device, the plurality of input settings; setting, by the server device, a linear proxy constraint based on the plurality of input settings, wherein the linear proxy constraint replaces a non-linear constraint; solving, by the server device, a system of equations to determine a feasible solution; determining the feasible solution, by the server device; based on the determining the feasible solution, determining, by the server device, whether a current solution satisfies a convergence criterion; in response to determining the current solution satisfies the convergence criterion, storing in the tangible memory, by the server device, the current solution; and in response to determining the current solution does not satisfy the convergence criterion, updating, by the server device, one or more of the input settings and solving the system of equations.

Aspect 2. The method of aspect 1, wherein the plurality of input settings defines a portfolio optimization strategy for a cash flow collateralized loan obligation (CLO).

Aspect 3. The method of any one of aspects 1-2, wherein all non-linear constraints are replaced by linear proxy constraints.

Aspect 4. The method of any one of aspects 1-3, further comprising determining a relationship between the non-linear constraint and the linear proxy constraint using machine learning.

Aspect 5. The method of any one of aspects 1-4, further comprising displaying, on the client device, a disparity between the non-linear constraint and the linear proxy constraint.

Aspect 6. The method of any one of aspects 1-5, further comprising a plurality of non-linear constraints and a plurality of proxy constraint settings, wherein the plurality of input settings comprises a prioritization of the plurality of non-linear constraints.

Aspect 7. The method of any one of aspects 1-6, further comprising a plurality of non-linear constraints and a plurality of proxy constraint settings, wherein the plurality of input settings comprises an adjustment controller for modifying one or more of the plurality of proxy constraint settings.

Aspect 8. The method of any one of aspects 1-7, wherein the plurality of input settings comprise a beta value corresponding to a beta distribution.

Aspect 9. The method of any one of aspects 1-8, further comprising: displaying, on the client device, a configuration user interface configured to receive the plurality of input settings from a user.

Aspect 10. The method of any one of aspects 1-9, further comprising: outputting, by the server device, the current solution to the client device; storing in a non-transitory media, by the client device, the current solution; and displaying, by the client device, a solution user interface based on the current solution.

Aspect 11. The method of any one of aspects 1-10, further comprising: determining, by the server device, the feasible solution does not exist to the system of equations; outputting, by the server device, an error message to the client device; and displaying, by the client device, the error message.

Aspect 12. A system, comprising: a server device, comprising a processor and a memory, the server device configured to: receive a plurality of input settings from a client device; store in the memory the plurality of input settings; set a proxy constraint based on the plurality of input settings to replace a non-linear constraint; solve a system of equations to determine a feasible solution; determine the feasible solution; based on the determined feasible solution, determine whether a current solution satisfies a convergence criterion; in response to determining the current solution satisfies the convergence criterion, store in the memory the current solution; and in response to determining the current solution does not satisfy the convergence criterion, update one or more of the input settings and solving the system of equations.

Aspect 13. The system of aspect 12, wherein the plurality of input settings defines a portfolio optimization strategy for a cash flow collateralized loan obligation (CLO).

Aspect 14. The system of any one of aspects 12-13, wherein all non-linear constraints are replaced by linear proxy constraints.

Aspect 15. The system of any one of aspects 12-14, wherein the server is further configured to determine a relationship between the non-linear constraint and linear proxy constraint using machine learning.

Aspect 16. The system of any one of aspects 12-15, further comprising a plurality of non-linear constraints and a plurality of proxy constraint settings, wherein the plurality of input settings comprises a prioritization of the plurality of non-linear constraints.

Aspect 17. The system of any one of aspects 12-16, further comprising a plurality of non-linear constraints and a plurality of proxy constraint settings, wherein the plurality of input settings comprises an adjustment controller for modifying one or more of the plurality of proxy constraint settings.

Aspect 18. The system of any one of aspects 12-17, wherein the plurality of input settings comprise a beta value corresponding to a beta distribution.

Aspect 19. The system of any one of aspects 12-18, wherein the server device is further configured to: output the current solution to the client device.

Aspect 20. The system of any one of aspects 12-19, wherein the server device is further configured to: determine the feasible solution does not exist to the system of equations; and output an error message to the client device.

Some embodiments can be provided to an end-user through a cloud-computing infrastructure. Cloud computing generally includes the provision of scalable computing resources as a service over a network (e.g., the Internet or the like).

The terminology used herein is intended to describe embodiments and is not intended to be limiting. The terms "a," "an," and "the" include the plural forms as well, unless clearly indicated otherwise. The terms "comprises" and/or "comprising," when used in this Specification, specify the presence of the stated features, integers, steps, operations, elements, and/or components, but do not preclude the presence or addition of one or more other features, integers, steps, operations, elements, and/or components.

It is to be understood that changes may be made in detail, especially in matters of the construction materials employed and the shape, size, and arrangement of parts without departing from the scope of the present disclosure. This Specification and the embodiments described are examples, with the true scope and spirit of the disclosure being indicated by the claims that follow.

What is claimed is:

1. A computer-implemented method, comprising:
   receiving, by a server device, a plurality of input settings from a client device;
   storing in a tangible memory, by the server device, the plurality of input settings, wherein the plurality of input settings defines a portfolio optimization strategy for a cash flow collateralized loan obligation (CLO);
   training a machine learning algorithm, wherein training comprises using mathematical functions via mixed integer programming technique and combined with convex and/or linear functions for determining a relationship between a non-linear constraint and a linear proxy constraint, wherein the relationship includes a misalignment between the non-linear constraint and the linear proxy constraint, and/or a disparity between the non-linear constraint and the linear proxy constraint, wherein the training includes the machine learning algorithm tracking execution results of the relationship;
   setting, by the server device, the linear proxy constraint based on the plurality of input settings, wherein the linear proxy constraint replaces the non-linear constraint;
   solving, by the server device, a system of equations to determine a feasible solution based on the linear proxy constraint that had replaced the non-linear constraint;
   determining the feasible solution, by the server device;
   based on the determining the feasible solution, determining, by the server device, whether a current solution satisfies a convergence criterion; and
   in response to determining the current solution satisfies the convergence criterion, modifying a current portfolio distribution to a new portfolio distribution based on the portfolio optimization strategy for the cash flow collateralized loan obligation (CLO).

2. The method of claim 1, wherein all non-linear constraints are replaced by linear proxy constraints.

3. The method of claim 1, further comprising displaying, on the client device, the disparity between the non-linear constraint and the linear proxy constraint.

4. The method of claim 1, further comprising a plurality of non-linear constraints and a plurality of proxy constraint settings, wherein the plurality of input settings comprises a prioritization of the plurality of non-linear constraints.

5. The method of claim 1, further comprising a plurality of non-linear constraints and a plurality of proxy constraint settings, wherein the plurality of input settings comprises an adjustment controller for modifying one or more of the plurality of proxy constraint settings.

6. The method of claim 1, wherein the plurality of input settings comprise a beta value corresponding to a beta distribution.

7. The method of claim 1, further comprising:
   displaying, on the client device, a configuration user interface configured to receive the plurality of input settings from a user.

8. The method of claim 1, further comprising:
   outputting, by the server device, the current solution to the client device;
   storing in a non-transitory media, by the client device, the current solution; and displaying, by the client device, a solution user interface based on the current solution.

9. The method of claim 1, further comprising:

determining, by the server device, the feasible solution does not exist to the system of equations;

outputting, by the server device, an error message to the client device; and displaying, by the client device, the error message.

10. A system, comprising:

a server device, comprising a processor and a memory, the server device configured to:

receive a plurality of input settings from a client device;

store in the memory the plurality of input settings, wherein the plurality of input settings defines a portfolio optimization strategy for a cash flow collateralized loan obligation (CLO);

train a machine learning algorithm, wherein training comprises using mathematical functions via mixed integer programming technique and combined with convex and/or linear functions to determine a relationship between a non-linear constraint and a linear proxy constraint, wherein the relationship includes a misalignment between the non-linear constraint and the linear proxy constraint, and/or a disparity between the non-linear constraint and the linear proxy constraint, wherein the training includes the machine learning algorithm tracking execution results of the relationship;

set the linear proxy constraint based on the plurality of input settings to replace the non-linear constraint;

solve a system of equations to determine a feasible solution based on the linear proxy constraint that had replaced the non-linear constraint;

determine the feasible solution;

based on the determined feasible solution, determine whether a current solution satisfies a convergence criterion; and in response to determining the current solution satisfies the convergence criterion, modify a current portfolio distribution to a new portfolio distribution based on the portfolio optimization strategy for the cash flow collateralized loan obligation (CLO).

11. The system of claim 10, wherein all non-linear constraints are replaced by linear proxy constraints.

12. The system of claim 10, further comprising a plurality of non-linear constraints and a plurality of proxy constraint settings, wherein the plurality of input settings comprises a prioritization of the plurality of non-linear constraints.

13. The system of claim 10, further comprising a plurality of non-linear constraints and a plurality of proxy constraint settings, wherein the plurality of input settings comprises an adjustment controller for modifying one or more of the plurality of proxy constraint settings.

14. The system of claim 10, wherein the plurality of input settings comprise a beta value corresponding to a beta distribution.

15. The system of claim 10, wherein the server device is further configured to:

output the current solution to the client device.

16. The system of claim 10, wherein the server device is further configured to: determine the feasible solution does not exist to the system of equations; and output an error message to the client device.

* * * * *